Figure 1:
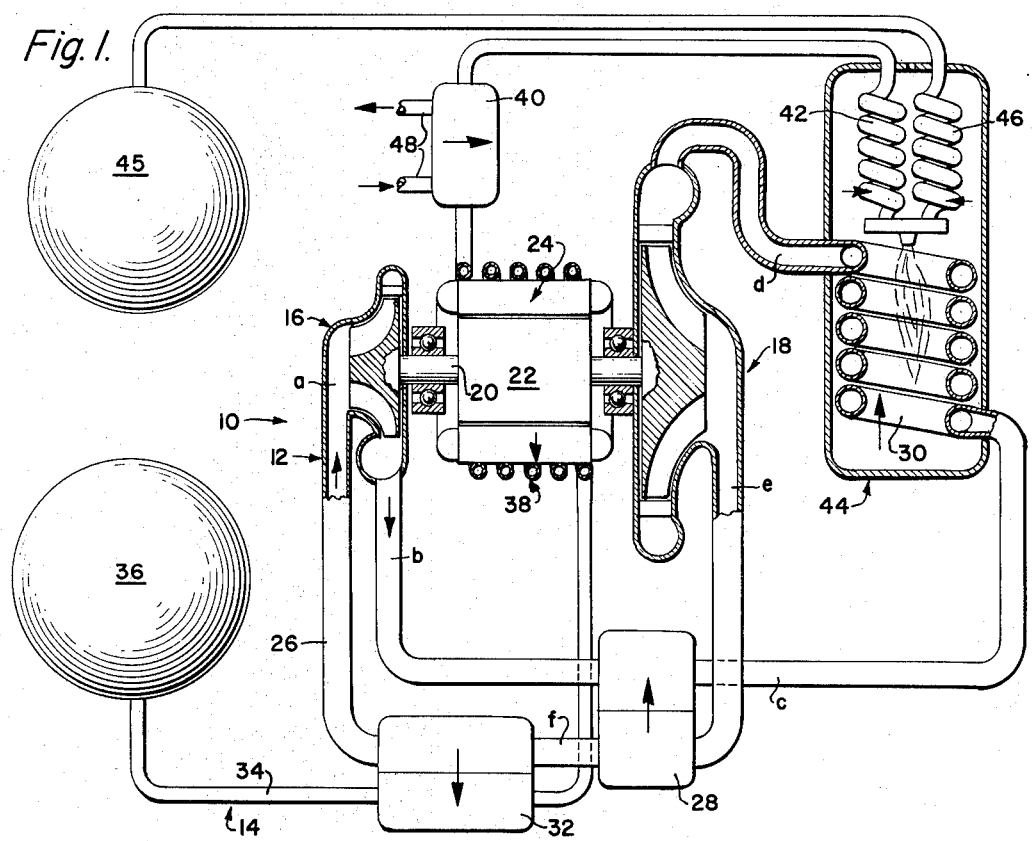

Feb. 1, 1966    R. L. ROBINSON ETAL    3,232,050
CRYOGENIC CLOSED CYCLE POWER SYSTEM
Filed March 25, 1963    3 Sheets-Sheet 1

INVENTORS:
RICHARD L. ROBINSON,
NGUYEN VAN LE,
BY
Attorney.

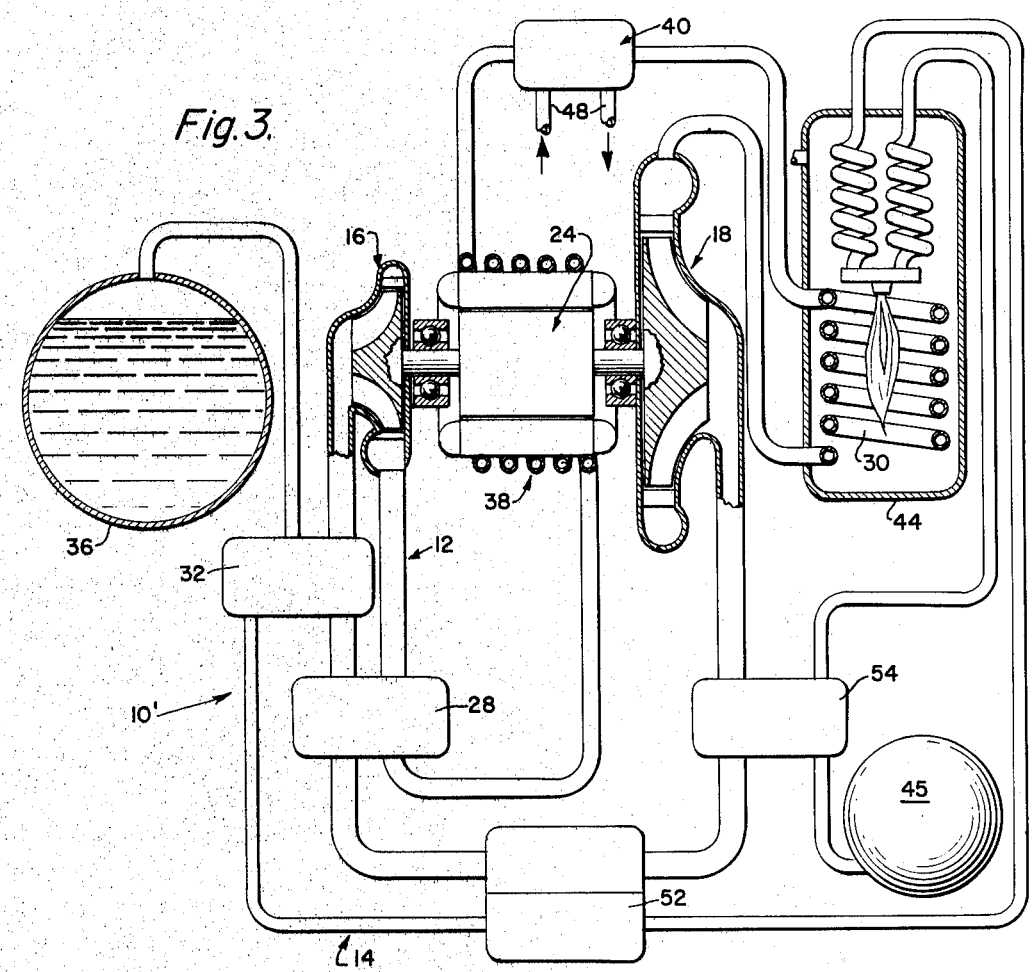

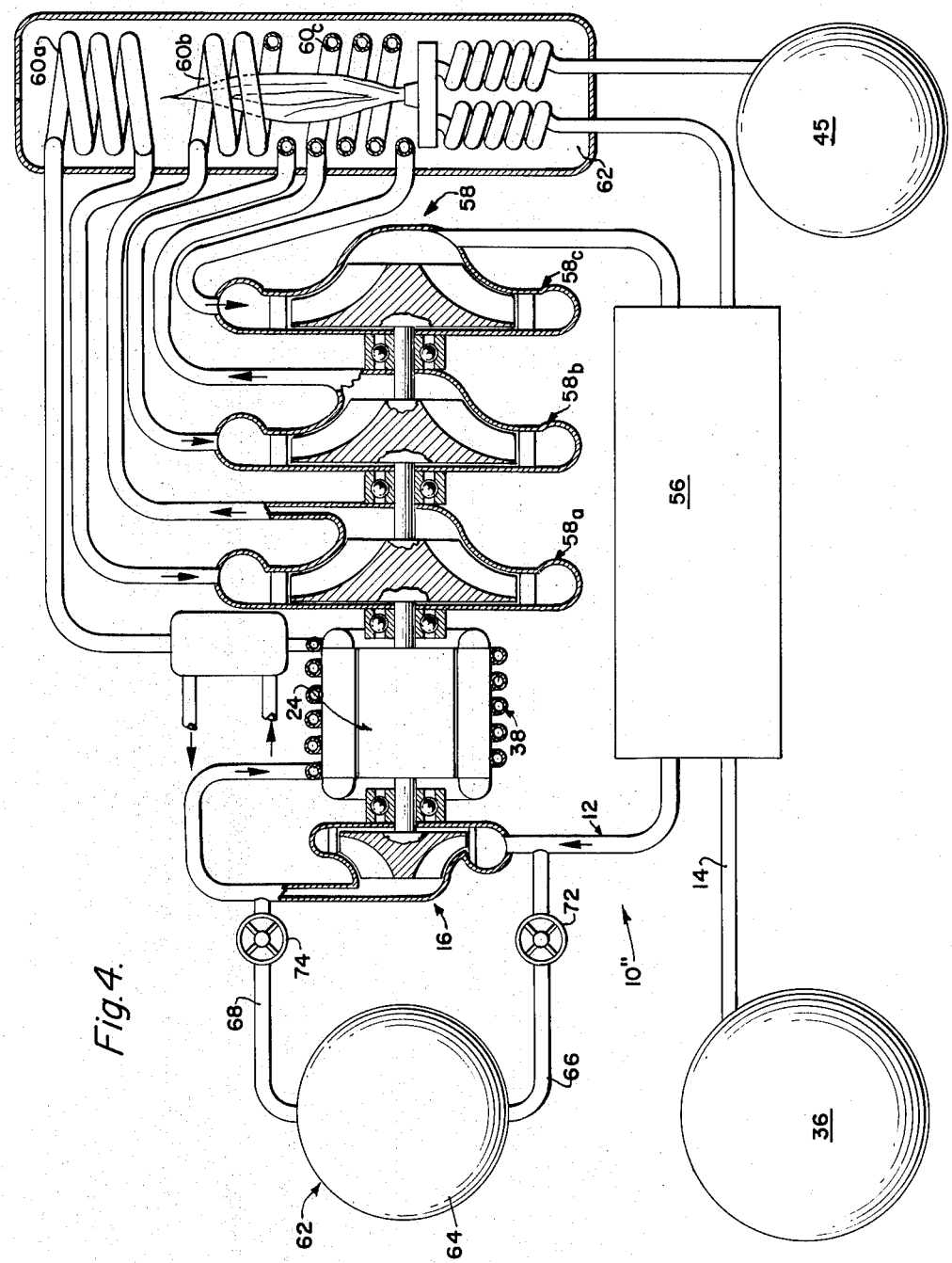

United States Patent Office 3,232,050
Patented Feb. 1, 1966

3,232,050
CRYOGENIC CLOSED CYCLE POWER SYSTEM
Richard L. Robinson and Nguyen Van Le, Los Angeles, Calif., assignors to The Garrett Corporation, Los Angeles, Calif., a corporation of California
Filed Mar. 25, 1963, Ser. No. 267,403
3 Claims. (Cl. 60—36)

This invention relates generally to the art of converting the chemical energy in a combustible fuel to mechanical energy. The invention relates more particularly to a closed cycle power system and method of power generation.

Both open cycle and closed cycle heat engine power systems are well known in the art. In the open cycle systems, the hot pressurized gas generated by combustion of a fuel is expanded directly through a heat engine, such as a fixed displacement expander or gas turbine, to produce mechanical work in the form of shaft rotation. After expansion through the engine, the working fluid, i.e. the spent exhaust gas, is exhausted to atmosphere. In the closed cycle power system, heat is transferred from the burning fuel to a working fluid which expands through a heat engine to produce mechanical work. This working fluid is contained in a closed working loop through which the fluid continuously recirculates.

While the requirements of power systems may vary to some extent depending upon the particular applications of the systems, high efficiency is a requirement common to all power systems. The efficiency of a heat engine power system, of course, is dependent upon several factors. Among the factors which determine the efficiency of such a power system are the temperatures at the inlet and exhaust of the heat engine in the system. Thus, it is known that the Carnot efficiency of any heat power system is $T_2-T_1/T_2$ where $T_1$ is the inlet temperature of the heat engine in the system and $T_2$ is the temperature to which the engine exhausts. While this Carnot efficiency is an ideal cycle efficiency which cannot be attained in practice, an increase in Carnot efficiency results in an increase in the actual efficiency of the over-all power system.

The Carnot efficiency of a heat engine power system is increased by increasing the temperature of the working fluid entering the heat engine and/or decreasing the temperature to which the engine exhausts. Maximum Carnot efficiency, then, dictates the use of a heat source of maximum temperature to heat the working fluid entering the engine, and the use of a heat sink of minimum temperature to extract heat from the working fluid exhausting from the engine.

The present invention satisfies the foregoing requirements for maximum Carnot efficiency in a new and unique way by using a combustible fuel, having a low boiling point and a high specific heat, as both a heat sink and a heat source in a closed cycle heat engine power system. Because of its very low boiling point and very high specific heat, cryogenic hydrogen, that is liquid hydrogen, is the preferred fuel for use in practicing the invention.

The use of cryogenic hydrogen fuel as both a heat sink and a heat source, while highly desirable from the standpoint of Carnot efficiency, presents certain difficulties which are overcome according to a further aspect of the invention. Thus, in every thermodynamic cycle, the working fluid that powers the heat engine is first compressed and heated to the desired engine inlet temperature and is then expanded through the engine during which energy is extracted from the fluid with a resultant drop in its temperature. The net or useful work which is thus produced is equal to the difference between the work required to elevate the working fluid from its initial state point to the desired state point at the engine inlet and the work performed by the working fluid during return of the latter to the initial state point of the cycle. In an open cycle system, where the working fluid, i.e. fuel, is continuously freshly supplied rather than recirculated, the work required to elevate the fluid to the state point at the engine inlet includes the work, if any, required to bring the fuel to the initial state point of the cycle.

In the ideal thermodynamic cycle, the net work, that is the ideal net work, per pound of working fluid is equal to the isentropic-enthalpy drop, or adiabatic head, across the expander or engine. For a given power output, this adiabatic head is extremely large in the case of cryogenic hydrogen as the working fluid in comparison to other cryogenic working fluid, such as argon or neon.

In a typical closed cycle power system according to the present invention, for example, where the expander is a gas turbine, the inlet temperature of the turbine is 2000° R., and the temperature at the initial state point of the working cycle is in the temperature range of liquid hydrogen, i.e. 14° K. to 20° K. Under these conditions, the adiabatic head across the turbine is 1,500,000 ft. in the case of hydrogen as the working fluid and only 65,000 ft. in the case of argon as the working fluid.

As a result, for a given shaft horsepower output from the power system, the mass flow of working fluid through the turbine is relatively high and the pressure drop through the turbine is relatively low when the working fluid is argon, whereas when the working fluid is hydrogen the mass flow rate through the turbine is relatively low and the pressure drop through the turbine is high. So far as these two working fluids are concerned, then, a power system using hydrogen as the working fluid is a high head-low flow system while one using argon as the working fluid is a low head-high flow system. A high head-low flow heat power system using cryogenic hydrogen as the working fluid presents certain difficulties in the design of the system components and other problems which do not exist in the case of argon as the working fluid. For example, a high head-low flow system requires pressure staging of the turbine to effect efficient extraction of mechanical power from the working fluid. Such a multistage turbine is difficult to design, costly to manufacture, and increases the complexity, size, and weight of the over-all power system. On the other hand, the use of cryogenic hydrogen in a power system of the kind under discussion is highly advantageous, as already noted, from the standpoint of high Carnot efficiency.

The present invention solves the foregoing dilemma by providing a closed cycle power system and method of mechanical power generation in which a cryogenic working fluid, such as argon, having a relatively low specific heat and other characteristics which permit a low head-high flow system, recirculates through a closed working loop or fluid circuit. According to the preferred practice of the invention, this working circuit includes a gas turbine driving a turbocompressor, and a regenerator for transferring heat from the turbine exhaust fluid to the turbine inlet fluid. Also included in the system is an open fluid circuit through which flows a fuel, preferably a high specific heat, low boiling point fuel such as cryogenic hydrogen. The open and closed fluid circuits of the system are thermally coupled by heat exchangers in such manner that the fuel serves first as a heat sink for extracting heat from the working fluid in the closed loop and then as a heat source for adding heat to the working fluid.

The invention embodies various other unique features of design and operation, such as a unique method of and means for controlling the power output of a closed cycle power system, which will become evident to those skilled in the art as the description proceeds.

A general object of the present invention, then, is to provide an improved closed cycle power generating system and method of power generation.

A more specific object of the invention is to provide a closed cycle power generating system and method wherein a combustible fuel serves both as a heat sink and heat source for the working fluid.

A further object of the invention is to provide a unique method of and means for regulating the power output of a closed cycle power system.

Other objects, advantages, and features of the invention will appear as the description proceeds.

Figure 2:
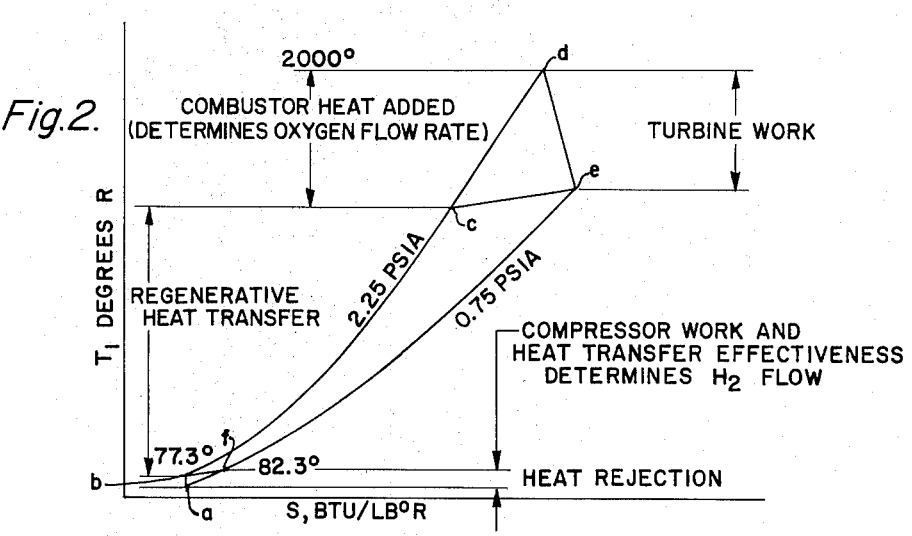

Certain illustrative embodiments of the invention will now be described by reference to the attached drawings, wherein:

FIG. 1 schematically illustrates one closed cycle power system according to the invention;

FIG. 2 illustrates the thermodynamic cycle for the power system in FIG. 1;

FIG. 3 schematically illustrates a modified closed cycle power system according to the invention; and FIG. 4 schematically illustrates yet a further modified closed cycle power system according to the invention.

The power system 10 shown in FIG. 1 comprises a closed working loop or circuit 12 and an open fuel circuit 14. The closed working circuit 12 includes a turbocompressor 16 and a gas turbine 18 having a common shaft 20. On this shaft is the rotor 22 of an alternator 24. The turbine 18 thus drives both the compressor 16 and the alternator 24.

Contained within the fluid line 26 of the working circuit 12 is a working fluid which, according to the preferred practice of the invention, is a low specific heat, cryogenic fluid such as argon. The outflow of working fluid from the compressor 16 occurs through a first heat exchanger, or regenerator, 28 and a second heat exchanger 30 to the inlet of turbine 18. The outflow of working fluid from the turbine occurs through the regenerator 28 and a third heat exchanger 32 to the inlet of compressor 16.

The open fuel circuit 14 of the power system 10 includes a fluid line 34 communicating at one end to a fuel storage vessel 36. The fuel which is employed in the present power system and stored in the vessel 36 comprises, according to the preferred practice of the invention, a high specific heat, cryogenic fuel, such as liquid or cryogenic hydrogen. In this case, the vessel 36 will be understood to comprise a suitably insulated cryogenic storage vessel.

Fuel flow in the open circuit 14 occurs from the storage vessel 36 through the heat exchanger 32 and a fourth heat exchanger 38. Fuel flow through this latter exchanger occurs in heat transfer relation to the alternator 24. After emerging from the exchanger 38, the fuel flows through a fifth heat exchanger 40 and a sixth heat exchanger, or regenerator, 42 to a combustor 44. This combustor receives oxygen from an oxygen storage vessel 45, preferably a cryogenic storage vessel containing oxygen in its liquid phase, and an oxygen preheater or heat exchanger 46.

The fuel and oxygen entering the combustor 44 are mixed and burned in heat transfer relation to the heat exchangers 30, 42 and 46 which are shown as being located directly in the combustion chamber of the combustor. The products resulting from the combustion of fuel and oxygen in the combustor 44 discharge to atmosphere or to other suitable receiving means. According to the preferred pratice of the invention, hydrogen, when used as the fuel, and oxygen are burned in the stoichiometric ratio so that the combustion products are steam.

The direction of heat flow in each of the several heat exchangers of the present power system is indicated by the small arrows in the drawing.

During operation of the power system 10, the working fluid in the closed working circuit 12 undergoes the thermodynamic cycle illustrated in FIG. 2. This cycle is preferably the Brayton cycle. The closed working circuit, however, may operate on other cycles. In the following description, the reference characters $a$, $b$, $c$, etc. refer to the state points on the cycle diagram of FIG. 2, which state points are also indicated in FIG. 1.

Referring now to FIGS. 1 and 2, it is evident that during operation of the power system, the working fluid has an initial state point $a$ at the inlet to the compressor 16. The fluid undergoes compression from state point $a$ to state point $b$ during its flow through the compressor and is then heated from state point $b$ to state point $c$ within the regenerator 28 by regenerative heat transfer from the turbine exhaust fluid. After emerging from the regenerator, the working fluid is heated from state point $c$ to state point $d$, corresponding to the inlet temperature to the turbine 18, by combustion of fuel and oxygen in the combustor 44.

During expansion through the turbine, the working fluid undergoes transition from state point $d$ to state point $e$ with a resultant decrease in the fluid temperatures. The working fluid exhausting from the turbine flows first through the regenerator 28, wherein the fluid is cooled from state point $e$ to state point $f$ by regenerative heat transfer to the compressor exhaust fluid, and then through the heat exchanger 32, wherein the working fluid is further cooled for state point $f$ to the initial state point $a$, by heat rejection to the fuel in the open fuel circuit 14.

As noted earlier, the combustible fuel which is uregd in the present power system is stored in the storage vessel 36, and, according to the preferred practice of the invention, comprises cryogenic hydrogen, that is hydrogen in its liquid phase. Fuel is expressed from the storage vessel, as by the vapor pressure of the fuel, and flows first through the heat exchanger 32, wherein the fuel is heated by heat transfer from the working fluid in the closed working circuit 12. The fuel is further heated by subsequent flow through the heat exchanger 38, wherein the fuel cools the alternator 24.

Heat exchanger 40 is designed to provide a heat sink for an external cooling system 48 so that the fuel is further heated during its flow through the latter exchanger. Subsequent flow of the fuel is through the heat exchanger 42, wherein the fuel is yet further heated by regenerative heat transfer from the combustion products exhausting from the combustor 44. Upon arrival at the combustor, the fuel is thus preheated and thereby conditioned for high temperature combustion in the combustor. Oxygen, of course, flows to the combustor 44 through the heat exchanger 46, wherein the oxygen is preheated to support the combustion of the fuel.

It is evident from the preceding description that the fuel which flows through the open fuel circuit 14 serves first as a heat sink for the closed working loop 12 in the heat exchanger 32 and then as a heat source for the working loop in the combustor 44. As noted earlier, it is the preferred practice of the invention to use a low specific heat, cryogenic fluid such as argon, as the working fluid of the present power system, cryogenic hydrogen as the fuel, and the Brayton cycle as the thermodynamic cycle for the working fluid. In this case, of course, the working fluid undergoes substantially adiabatic compression between state points $a$ and $b$ in FIG. 2, substantially constant pressure temperature rise between state points $b$ and $d$, substantially adiabatic expansion between state points $d$ and $e$, and substantially constant pressure temperature drop between state points $e$ and $a$. FIG. 2 indicates cycle pressures and temperatures for a typical power system of this kind.

As noted earlier, the Carnot and cycle efficiency of the power system is dependent upon the difference between the maximum and minimum cycle temperatures. The use of cryogenic hydrogen as the heat sink and heat source of the power system, then, permits high Carnot and cycle efficiencies to be attained. For example, a typical cryogenic power system according to the invention has a Carnot efficiency of 98% and a cycle efficiency of 85%, with system components of normal efficiency.

The closed cycle power system 10' of FIG. 3 is very similar to the power system of FIG. 1. In the power system of FIG. 3, however, the heat exchangers 38 and 40 for the alternator 24 and the external cooling circuit 48, respectively, are located in the closed working circuit 12, between the regenerator or recuperator 28 and the combustion heat exchanger 30, rather than in the open fuel circuit, as in FIG. 1. Also, additional heat exchangers 52 and 54 are provided to thermally couple the closed working circuit 12 at the turbine exhaust to the open fuel circuit 14 immediately before the combustor 44 and to the oxygen circuit leading from the oxygen storage vessel 45 to the combustor 44.

In the power system of FIG. 3, as in the power system of FIG. 1, the fuel is contained in a storage vessel 36 and preferably comprises cryogenic hydrogen. In the power system of FIG. 3, however, the fuel circuit opens to the vapor space above the main body of liquid fuel in the storage vessel. As a result, fuel vapor flows from the fuel storage vessel, through the fuel circuit to the combustor 44, whereas in the power system of FIG. 1, the fuel exists in its liquid phase as it emerges from the fuel storage vessel.

The power system of FIG. 3 operates in substantially the same way as the power system of FIG. 1 except that in the power system of FIG. 3, heat rejection from the closed working circuit 12 to the open fuel circuit 14, and resultant heating of the fuel, takes place in two heat exchangers, namely exchangers 32 and 52 rather than in one heat exchanger as in FIG. 1. Also, the oxygen flowing to the combustor 44 is preheated, in the heat exchanger 54, by the working fluid exhausting from the turbine 18 in the closed working loop 12. Finally, in the power system of FIG. 3, the generator 24 and the external cooling system 48 are cooled by the working fluid, which is thereby heated, rather than by the fuel. The fuel serves both as a heat sink and a heat source in the power system of FIG. 3 as it does in the power system of FIG. 1.

The modified closed cycle power system of FIG. 4 differs from that of FIG. 3 in four respects. Firstly, the regenerator 28 and the oxygen preheating exchanger 54 in FIG. 3 are omitted in the power system of FIG. 4. Secondly, the two heat exchangers 32 and 52 which thermally couple the closed working fluid circuit 12 and the open fuel circuit 14 in FIG. 3 are replaced by a single extended heat exchanger 56 in FIG. 4. Thirdly, the turbine 58 in the closed working circuit 12 of the power system of FIG. 4 has several stages 58a, 58b, 58c. Preceding these turbine stages are heat exchangers 60a, 60b, 60c which are disposed in heat transfer relation to the burning fuel in the combustor 62.

The closed cycle power system of FIG. 4 is otherwise identical to the power system of FIG. 3, except for the one remaining difference discussed below. It is evident, therefore, that the power system of FIG. 4 operates in much the same way as the power system of FIG. 3 except that the working fluid in the closed working circuit 12 is expanded in stages through the turbine 58 and is reheated between the second and third turbine stages. The fuel in the open fuel circuit 14, of course, provides both a heat sink and a heat source for the closed working circuit 12 of the power system.

The one remaining difference, just referred to, between the closed cycle power systems of FIGS. 3 and 4 resides in a control means 62 which is embodied in the power system of FIG. 4 to control the power output of the system. This control means comprises an accumulator 64, the fluid receiving space in which communicates with the inlet of the compressor 16 via a fluid line 66 and to the outlet of the compressor via a fluid line 68. In fluid line 66 is a valve 72. In fluid line 68 is a valve 74. It is to be understood that while these valves are shown as comprising simple manual valves, remotely or automatically controlled valves may be used. The control accumulator is so designed that if valve 74 between the accumulator and the compressor outlet is opened, working fluid bleeds from the closed working circuit into the accumulator, thereby decreasing the density of the fluid remaining in the circuit and hence power output. If valve 72 between the control accumulator 64 and the compressor inlet is opened, working fluid bleeds back into the closed working circuit thereby increasing the density of the working fluid in the loop and power output.

The invention herein described and illustrated is then obviously capable of attaining the objects and advantages preliminarily set forth.

While certain preferred embodiments and practices of the invention have been disclosed, numerous modifications of the invention are possible within its spirit and scope.

We claim:
1. A power generating system comprising:
   a closed fluid circuit containing a compressible working fluid and including a compressor for compressing said fluid, a fluid expansion motor through which said fluid expands to drive the motor, an electrical generator, and means drivably coupling said motor to said compressor and generator, whereby the compressor and generator are driven by said motor;
   an open fuel circuit including a storage vessel for containing a fuel and a combustor communicating with said vessel for burning said fuel;
   a first heat exchanger termally coupling said closed fluid circuit adjacent the compressor inlet to said open fuel circuit adjacent said storage vessel for conveying the working fluid entering the compressor in heat transfer relation to fuel in said open circuit;
   a second heat exchanger thermally coupling said closed fluid circuit adjacent the motor inlet to said open fuel circuit adjacent said combustor for conveying the working fluid entering said motor in heat transfer relation to the burning fuel in said combustor; and
   a third heat exchanger in said closed fluid circuit between said first and second heat exchangers disposed in heat transfer relation to said generator.

2. A power generating system comprising:
   a closed fluid circuit containing a compressible working fluid and including a compressor for compressing said fluid, a fluid expansion motor through which said fluid expands to drive the motor, an electrical generator, and means drivably coupling said motor to said compressor and generator, whereby the compressor and generator are driven by said motor;
   an open fuel circuit including a storage vessel for containing a fuel, and a combustor communicting with said vessel for burning said fuel;
   a first heat exchanger thermally coupling said closed fluid circuit adjacent the compressor inlet to said open fuel circuit adjacent said storage vessel for conveying the working fluid entering the compressor in heat transfer relation to fuel in said open circuit;
   a second heat exchanger thermally coupling said closed fluid circuit adjacent the motor inlet to said open fuel circuit adjacent said combustor for conveying the working fluid entering said motor in heat transfer relation to the burning fuel in said combustor;
   a third heat exchanger thermally coupling said open fuel circuit to said combustor for conveying the fuel entering the combustor in heat transfer relation to the burning fuel in the combustor; and
   a fourth heat exchanger in said closed fluid circuit between said first and second heat exchangers disposed in heat transfer relation to said generator.

3. A power generating system comprising:
   a closed fluid circuit containing a compressible working fluid and including a compressor for compressing said fluid, a fluid expansion motor through which the fluid expands to drive said motor, and means drivably coupling said motor and compressor whereby the latter is driven by said motor;

a first open fuel circuit including a first storage vessel for containing a combustible fuel;

a second open fuel circuit including a second storage vessel for containing oxygen;

a combustor communicating with said storage vessels for burning said fuel and oxygen;

a first heat exchanger means thermally coupling said closed fluid circuit between the compressor and the motor to said first and second open fuel circuits adjacent said first and second storage vessels for cooling the working fluid entering the compressor;

a second heat exchanger means thermally coupling said closed fluid circuit adjacent the motor inlet to said first and second open fuel circuits adjacent said combustor for conveying the working fluid entering said motor in heat transfer relation to burning fuel in said combustor; and a third heat exchanger means thermally coupling said first and second open fuel circuits to said combustor for conveying the fuel and oxygen entering the combustor in heat transfer relation to the burning fuel in the combustor.

References Cited by the Examiner

UNITED STATES PATENTS

| | | | |
|---|---|---|---|
| 2,406,926 | 9/1946 | Summerfield | 60—35.6 |
| 2,641,905 | 6/1953 | Keller | 60—59 |
| 2,690,051 | 9/1954 | Peskin | 60—59 |
| 2,780,065 | 2/1957 | Spannhake | 103—223 X |
| 2,893,204 | 7/1959 | Anderson et al. | 60—39.18 |
| 2,955,420 | 10/1960 | Schirmer | 60—39.82 X |
| 3,061,733 | 10/1962 | Humpal | 60—36 X |

FOREIGN PATENTS 542,292   1/1942   Great Britain.

OTHER REFERENCES

Howard et al.: "Generation of Electric Power in Space Vehicles by Means of Cryogenic Fuel Powered Engine," paper No. 590,982, Air Transportation Conference of the Summer and Pacific General Meeting of the AIEE, Seattle, Wash., June 26, 1959, 16 pp.

MARK NEWMAN, *Primary Examiner.*

SAMUEL LEVINE, *Examiner.*